United States Patent
Oberhofer et al.

(10) Patent No.: US 11,106,820 B2
(45) Date of Patent: Aug. 31, 2021

(54) DATA ANONYMIZATION

(71) Applicant: INTERNATIONAL BUSINESS MACHINES CORPORATION, Armonk, NY (US)

(72) Inventors: Martin Oberhofer, Bondorf (DE); Albert Maier, Tuebingen (DE); Yannick Saillet, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 382 days.

(21) Appl. No.: 15/924,345

(22) Filed: Mar. 19, 2018

(65) Prior Publication Data

US 2019/0286849 A1   Sep. 19, 2019

(51) Int. Cl.
*G06F 21/62* (2013.01)
*G06F 16/21* (2019.01)
*G06F 16/23* (2019.01)

(52) U.S. Cl.
CPC .......... *G06F 21/6254* (2013.01); *G06F 16/21* (2019.01); *G06F 16/2365* (2019.01)

(58) Field of Classification Search
CPC ...... G06F 16/214; G06F 16/215; G06F 16/21; G06F 16/2365; G06F 21/6254
See application file for complete search history.

(56) References Cited

U.S. PATENT DOCUMENTS

| | | | |
|---|---|---|---|
| 7,979,410 B2* | 7/2011 | Pattabhi | G06F 21/64 707/705 |
| 8,978,153 B1* | 3/2015 | Cuthbertson | G06F 21/6254 726/26 |
| 9,087,215 B2 | 7/2015 | LaFever et al. | |
| 9,230,132 B2 | 1/2016 | Gkoulalas-Divanis | |
| 9,934,409 B2* | 4/2018 | Cuthbertson | H04L 9/0894 |
| 2003/0140043 A1* | 7/2003 | Hotchkiss | G16H 10/20 |
| 2007/0226196 A1* | 9/2007 | Adya | G06F 16/24539 |
| 2012/0066214 A1 | 3/2012 | Nelke et al. | |

(Continued)

FOREIGN PATENT DOCUMENTS

| | | |
|---|---|---|
| CN | 102867022 A | 1/2013 |
| CN | 104732154 A | 6/2015 |

(Continued)

OTHER PUBLICATIONS

GL Communications Inc, "Call Data Records", https://www.gl.com/call-data-recording-and-analysis.html, Telecommunications Products and Consulting, printed Nov. 29, 2017, pp. 1-5.
"Data De-identification and Anonymization of Individual Patient Data in Clinical Studies—A Model Approach", 2013 TransCelerate Biopharma Inc., pp. 1-15.
Wikipedia, "MinHash", https://en.wikipedia.org/wiki/MinHash, printed Nov. 29, 2017, pp. 1-7.

(Continued)

*Primary Examiner* — Trang T Doan
(74) *Attorney, Agent, or Firm* — Dmitry Paskalov (57) ABSTRACT

The present disclosure relates to a method for data anonymization of a database system. The method comprises: determining if a first dataset and second dataset of the database system have a relationship indicative of an entity having values in the two datasets. A request may be received from a user for at least one of the first and second datasets. In case the first dataset and second dataset have the relationship, at least one of the first and second datasets may be modified such that the indication of the entity is not accessible to the user. And the requested dataset may be provided.

9 Claims, 4 Drawing Sheets

(56) References Cited

U.S. PATENT DOCUMENTS

| | | | |
|---|---|---|---|
| 2012/0246696 A1* | 9/2012 | Boukobza | G06F 21/6254 726/1 |
| 2013/0282679 A1* | 10/2013 | Khin | G06F 16/258 707/698 |
| 2014/0137262 A1* | 5/2014 | Stofberg | G06F 11/1453 726/26 |
| 2014/0281512 A1* | 9/2014 | Arasu | H04L 63/062 713/165 |
| 2015/0127575 A1* | 5/2015 | Heizmann | G06F 21/6254 705/342 |
| 2016/0014109 A1* | 1/2016 | Antunes | H04L 63/1441 726/9 |
| 2016/0342633 A1* | 11/2016 | Senthilnathan | G06F 16/134 |
| 2017/0104756 A1 | 4/2017 | Rosenthal et al. | |
| 2017/0364699 A1* | 12/2017 | Goldfarb | G06F 21/6227 |
| 2018/0129712 A1* | 5/2018 | Mankovskii | G06F 16/2365 |
| 2018/0157468 A1* | 6/2018 | Stachura | G06F 8/38 |
| 2018/0165475 A1* | 6/2018 | Veeramachaneni | G06N 7/005 |
| 2019/0220619 A1* | 7/2019 | Loza | G06F 21/602 |

FOREIGN PATENT DOCUMENTS

| | | |
|---|---|---|
| CN | 106687984 A | 5/2017 |
| EP | 3166053 A1 | 5/2017 |
| WO | 2016074094 A1 | 5/2016 |
| WO | 2016081269 A1 | 5/2016 |

OTHER PUBLICATIONS

Papenbrock et al., "Divide & Conquer-based Inclusion Dependency Discovery", Proceedings of the VLDB Endowment, vol. 8, No. 7, Copyright 2015 VLDB Endowment 21508097/15/03, pp. 1-12.
Sharad et al., "De-anonymizing D4D Datasets", 6th Workshop on Hot Topics in Privacy Enhancing Technologies 2013, pp. 1-18.
Springer, "Re-identification and information fusion between anonymized CDR and social Network Data", Journal of Ambient Intelligence and Humanized Computing, Feb. 2016, vol. 7, Issue 1, pp. 83-96, First online: Jul. 14, 2015, https://link.springer.com/article/10.1007/s12652-015-0303-x, pp. 1-5.
Cecaj et al., "Re-identification of anonymized CDR datasets using social network data", The Third IEEE International Workshop on the Impact of Human Mobility in Pervasive Systems and Applications, 2014, pp. 1-6.
Pending U.S. Appl. No. 15/815,743, filed Nov. 17, 2017, entitled: "Cognitive Data Anonymization", pp. 1-33.
Mell et al., "The NIST Definition of Cloud Computing", National Institute of Standards and Technology, Special Publication 800-145, Sep. 2011, pp. 1-7.
International Searching Authority, "International Search Report", Patent Cooperation Treaty, Jul. 10, 2019, 4 pages, International Application No. PCT/IB2019/052201.

\* cited by examiner

DATA ANONYMIZATION

BACKGROUND

The present invention relates to the field of digital computer systems, and more specifically, to a method for data anonymization.

Privacy regulations do not allow the usage of the individual's data for certain kind of analytics unless they explicitly declared their consent with that usage. On the other hand, it may be acceptable to collect and store personal data and to use it in analytics as long as the data is anonymized. For example, if the data processed by a controller do not permit the controller to identify a person, the data can be analyzed. However, this requires that the anonymization is correctly and sufficiently applied to prevent identification of the entities associated with the private data.

SUMMARY

Various embodiments provide a method for data anonymization, computer system, and computer program product as described by the subject matter of the independent claims. Advantageous embodiments are described in the dependent claims. Embodiments of the present invention can be freely combined with each other if they are not mutually exclusive.

In one aspect, the invention relates to a method for data anonymization of a database system. The method comprises:
  (a) determining if a first dataset and second dataset of the database system have a relationship indicative of an entity having values (e.g. attribute values) in the two datasets;
  (b) receiving a request from a user for at least one of the first and second datasets;
  (c) in case the first dataset and second dataset have the relationship, modifying at least one of the first and second datasets such that the indication of the entity is not accessible to the user;
  (d) providing the requested dataset.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for data anonymization of a database system. The computer system is configured for:
  (a) determining if a first dataset and second dataset of the database system have a relationship indicative of an entity having values in the two datasets;
  (b) receiving a request from a user for at least one of the first and second datasets;
  (c) in case the first dataset and second dataset have the relationship, modifying at least one of the first and second datasets such that the indication of the entity is not accessible to the user;
  (d) providing the requested dataset.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "dataset" or "information asset" refers to a collection of one or more data elements. A data element may for example be a document a data value or a data record. For example, the dataset may be provided in the form of a collection of related records contained in a file e.g. the dataset may be a file containing records of all students in class. A record is a collection of related data items e.g. roll number, date of birth, a class of a student. A record represents an entity, wherein the entity has a distinct and separate existence e.g. such as a student. The dataset may for example be a table of a database or a file of a Hadoop file system, etc. In another example, the dataset may comprise a document such as a HTML page or other document types. The document may for example comprise data of a patient.

For example, an entity having values in two datasets may for example be an entity having at least one record in at least one of the first and second datasets. For example, the relationship may indicate that a patient X having a record in the first dataset is also having another related record in the second dataset (e.g. the two records of patient X may be linked via his address, wherein the first record has no full name while the second record contains the full name of the patient X). Thus, the patient X is the entity that is indicated by the relationship between the first and second datasets.

A relationship between two datasets may be a link between one or more columns/attributes of a dataset to other one or more columns of the other datasets. For example, the relationship may be a primary foreign key (PK-FK) relationship. In another example, the relationship may comprise a link from one document to another document such as a link from an XML document pointing to another document containing more information on the same entity, or a link from an unstructured document containing related information. If the data are stored as triplets in a triple store (ex: RDF data) or the data are stored in a graph DB, the relationship may be a link between one entity to another entity. The relationship may for example enable to join the first and second datasets together, so that the records of the first dataset and the records of the second dataset representing a same entity are merged in a new single record of a joined dataset representing the combined information contained in the two datasets for the same entity. The combined information may reveal confidential data of that entity although the two datasets are each anonymized.

The term "user" refers to an entity e.g., an individual, a computer, or an application executing on a computer, a container, a file system, a directory. The user may for example represent a group of users. The database system may comprise one or more storages for storing datasets. The database system may for example comprise at least one of a document store, triple store, graph DB and relational database. The first and second datasets may be stored on the same or different storages of the database system.

At the time of accessing an information asset for processing, a check may for example be done to see if the asset contains sensitive information and needs anonymization. If yes, appropriate anonymization measures using a predefined data masking technique is applied. If two or more information assets are marked for combined use a check is done if that would yield a potential breach of anonymization. If yes, appropriate anonymization measures using a predefined masking technique is applied. The check may be implemented on technical metadata which has been established for the information assets and registered in an information governance catalog.

The present method may prevent the loss of data anonymization in case of two or more information assets being brought together where each individually is anonymized enough but the information assets used together break the data anonymization. The present method may particularly be advantageous in case of big data and Data Lake architectures in particular, where a single system like a large-scale Hadoop cluster in the Data Lake stores tens of thousands of information assets available to Data Scientists to be analyzed together and having many combinations that may not be catered for ahead of time. For such systems, the present method may provide a way to anticipate which information assets may be used together in one data analysis. For example, the present method may avoid a breach of the anonymization, wherein a breach of anonymization may have the following characteristics. Across two or more information assets one or more attributes can be joined. Across two or more information assets, in one information asset a particular entity or attribute group or attribute had to be masked according to an information governance policy. And, across two or more information assets, at least in one information asset the protected domain in one of the other assets is not masked allowing once joined to breach anonymization.

Another advantage may be that the present method may enable a pro-active and automated data protection measures by ensuring data anonymization where needed providing an optimal balance between data protection and data usability. For example, the two datasets may each be anonymized and cannot be the source of any sensitive information if each accessed independent of each other. However, as the user can combine the first and second datasets to access the entity, the present method acts a posteriori by performing the modification already at the time of receiving the request of one of the two datasets, thereby anticipating the case where the user may request the second dataset separately at a later stage. In other terms, this may prevent the case where a data scientist may obtain anonymized data sets where each dataset complies with the governance policies but where the anonymization could be worked around by joining multiple policies compliant data sets together, obtaining a resulting data set which is not compliant anymore with the policy.

The present method may further prevent unintentional data leaks that may cause reputational loss and/or fines.

Another advantage may be that the present method provides an improved compliance with regulations which are easy to audit since the process may be metadata-driven based on an information governance catalog including full data lineage and other audit trails. According to one embodiment, the first and second datasets comprise records, each record being a combination of attribute values of a respective entity, wherein the entity indicated by the relationship is an entity of at least one record of the first and/or second datasets. For example, an example method for data anonymization of a database system may be provided. The example method comprises: determining if a first dataset and second dataset of the database system have a relationship indicative of an entity of at least one record of the two datasets; receiving a request from a user for at least one of the first and second datasets; in case the first dataset and second dataset have the relationship, modifying at least one of the first and second datasets such that the indication of the entity is not accessible to the user; and providing the requested dataset.

According to one embodiment, the method further comprises determining relationships between all datasets of the database system, and providing a metadata structure comprising information on the determined relationships, wherein the determining if the first and second datasets have the relationship is performed using the metadata structure. In this way, the method may automatically be performed without need for an explicit on-demand relationship determination. This may particularly be advantageous in large systems where many data requests are received per time unit. As the metadata structure is created for once and not reprocessed for each received request, this may save processing time.

According to one embodiment, the method further comprises: in response to a change in the database system, re-determining the relationships between datasets of the database system and updating the metadata structure accordingly. This may provide an up-to-date source of information and may thus further secure access to data by performing accurate anonymization.

For example, a predefined function (e.g. a PK-FK relationship discovery algorithm) may be used to determine all possible relationships (e.g. PK-FK relationships) between all datasets in the database system, and store all these determined relationships in the metadata structure. When new datasets are added, the same function may be rerun focusing on identifying the relationships where at least one side of the relationship is in the new dataset. The metadata structure may be updated accordingly. When a dataset is removed, possible relationships or all relationships involving the removed dataset may be removed from the list. This embodiment may continuously run in the background to detect changes in the list of datasets available in the database system and trigger the PK-FK relationship discovery algorithm to update the list of relationships as soon as a change is detected.

According to one embodiment, the modification is performed in response to determining that an access to the entity by the user would violate a predefined governing policy (or rule). This may enable a selective access to data and thus an optimal control of data access.

As an example a governing policy could specify "if a user has role A and a dataset contains columns that are flagged in a catalog as being sensitive personally identifiable information and the dataset also contains columns flagged as identifiers or quasi-identifiers, then the dataset needs to be anonymized". For example, for a given (privileged) user the modification may not be performed and the data may be provided without modification. However, for other (untrusted) users the modification is performed. In this case, the governing policy requires that the entity (e.g. person full name) can be accessed by the given type of users but not by other type of users.

According to one embodiment, the determining if the relationship is indicative of the entity comprises: identifying one or more source columns of the first dataset that reference to respective target columns of the second dataset, combining the source and target columns, and based on the combination result determining that the relationship is indicative or not indicative of the entity. According to one embodiment, the combination is performed using one or more SQL join operations. This may enable a seamless integration of these embodiments with exiting database systems for securing access to data in such systems.

According to one embodiment, the determined relationship is a primary foreign key relationship. A PK-FK relationship is made up of a pair of columns or a pair of group of columns between which an inclusion dependency exists. Additionally the column and group of columns forming the primary key may be unique. The search of inclusion dependencies in a group of datasets may for example be performed by combining them with the MinHash or domain signature techniques, and using the cardinality of the columns to limit the search to combinations where one side of the relationship is unique or nearly unique. This may enable a mechanism allowing to determine in a fully automatic way and in a reasonable amount of time all the possible PK-FK relationships of a group of datasets and thus all the possible ways of joining the data in a group of data set.

According to one embodiment, the method further comprises performing the determining if the first dataset and second dataset have the relationship in response to receiving the request and to determining that the first and second datasets are accessible by the user. This may enable a per-demand approach where only under certain conditions the determination of the datasets is performed. This may particularly be advantageous in case of systems having a low access frequency to data, because there may be no need to automatically determine the relationships for all data if only part of the data is to be used. This may save processing resources.

According to one embodiment, the modifying of first and/or second datasets comprises masking one or more columns of the requested dataset. The modification of the first and/or second datasets is performed using an anonymization algorithm. The anonymization algorithm is at least one of the following: generalization, redaction, suppressing, sampling, randomization, data swapping, masking, enumeration.

This embodiment may have a benefit that personally identifiable information within data sets of interest may be modified in a way, that information that would be able to identify e.g. a single person is omitted while, at the same time, information that is useful for analysis may be maintained.

According to one embodiment, the determining of the relationship is automatically performed. For example, the determining of the relationship may be performed on a time period basis.

According to one embodiment, the determining of the relationship is automatically performed in response to detecting a change in the database system. For example, the change in the database system may comprise an addition of at least one of the first and/or second datasets into the database system or a change of the first and/or second dataset.

Figure 1:
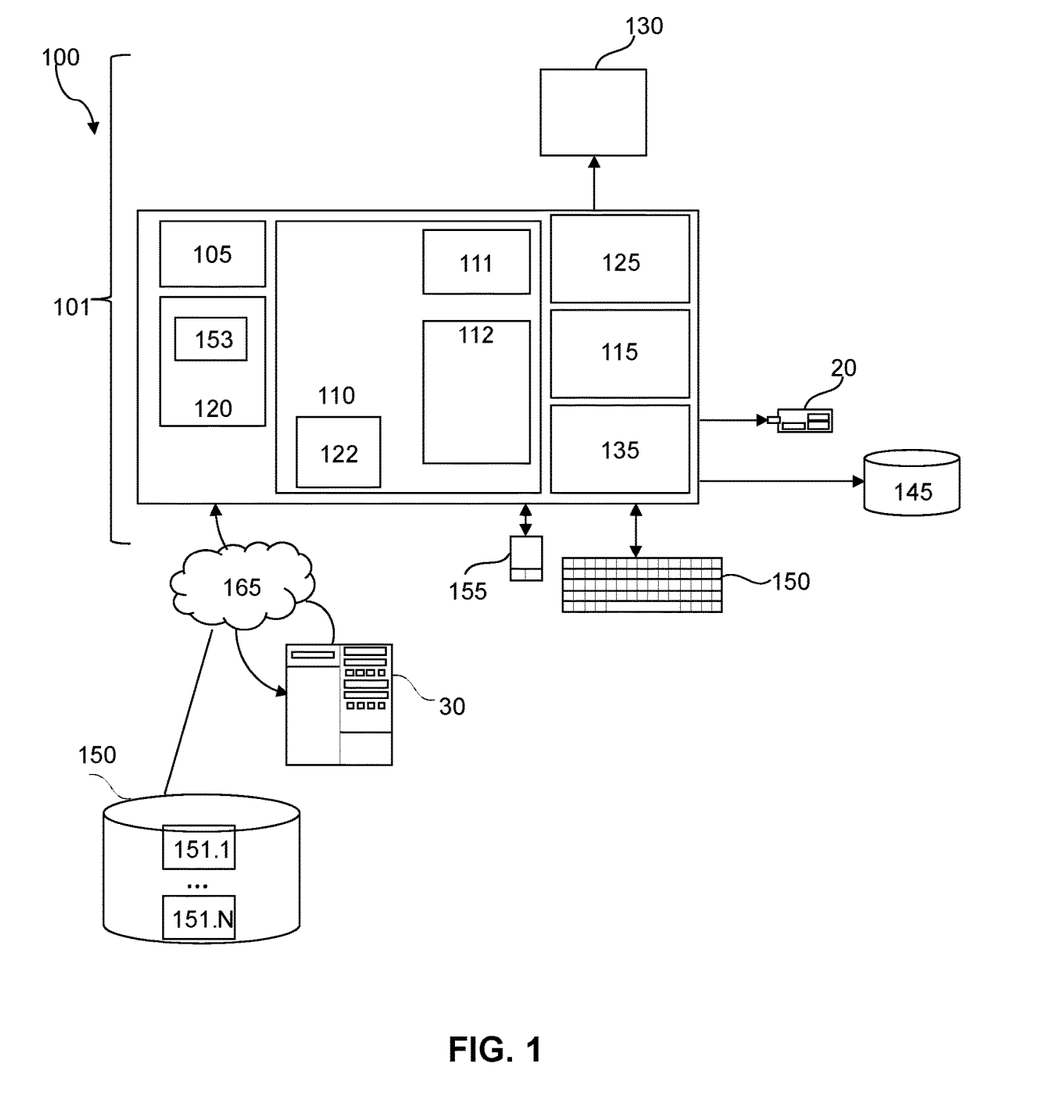
FIG. 1 depicts a block diagram of a storage system in accordance with the present disclosure.

FIG. 1 represents a general computerized system 100 suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

Figure 2:
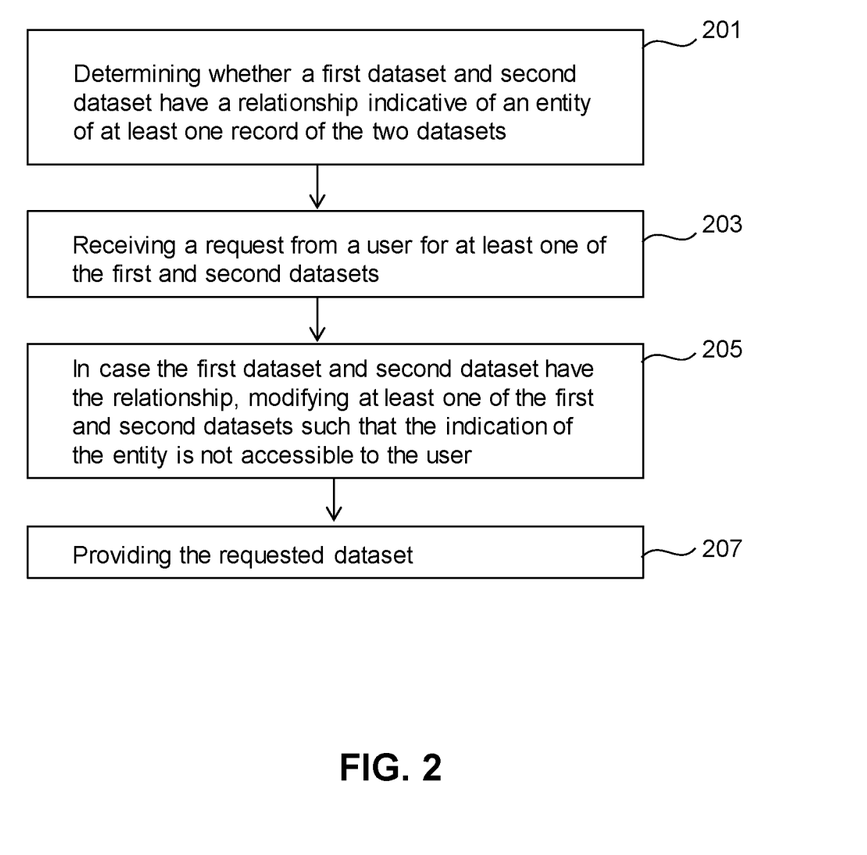
FIG. 2 is a flowchart of a method for data anonymization of data of a database system.

In exemplary embodiments, in terms of hardware architecture, as shown in FIG. 2, the computer 101 includes a processor 105, memory (main memory) 110 coupled to a memory controller 115, and one or more input and/or output (I/O) devices (or peripherals) 20, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macro processor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 2, software in the memory 110 includes instructions 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The system 100 further comprises a database system 150. The database system 150 comprises datasets 151.1-151.N. Metadata descriptive or indicative of the datasets 151.1-N may be stored in a catalog 153. The catalog 153 may for example comprise data profiling of the datasets 151.1-N. The data profiling may indicate in which semantical domain a particular attribute or group of attributes belong. The catalog 153 may further comprise classification information on the datasets 151.1-N. For example, a predefined data classification analysis function may assign each column of the datasets 151.1-N into categories e.g. each category may be identified by a classification identifier. The catalog 153 may for example store each classification identifier and associated columns. The catalogue 153 may further comprise governance policies. A governance policy may for example indicate which attributes need protection through anonymization (e.g. a credit card number, person names and addresses, etc.) and which anonymization algorithm to use. The catalog 153 may further comprise data models, wherein a data model provides details about how data is structured, mapped, and linked. The database system 150 is shown as a single component for exemplification purpose only. However, other examples of database systems may be used. For example, the database system 150 may comprise multiple storages. The multiple storages may or may not be connected to each others.

FIG. 2 is a flowchart of a method for data anonymization of data of a database system 150.

In step 201, it may be determined whether a first dataset e.g. 151.2 and at least one second dataset e.g. 151.4 of the database system 150 have a relationship indicative of an entity of at least one record of the two datasets (or indicative of an entity having values in at least one of the two datasets). An indication of the entity (e.g. such as person's full name) may not fulfill the governance policies, therefore an anonymization may be required. In case the database system comprises multiple storages, the first and second datasets may be stored on the same or different storages. The relationship may for example enable to join attribute values in the first dataset and second datasets together, so that the joining result represents a same entity (e.g. see the example of call detail records described below). The joined attribute values may belong to the indicated entity in both datasets or may belong the indicated entity in one of the two datasets and the other dataset may comprise attribute values of another entity e.g. related to the indicated entity. For example, the first dataset is a patient file comprising attribute values of a Patient X having a given address and the second dataset (e.g. a social media profile) may comprise attribute values of a relative of the patient X associated with his first name and the same given address. The combination of the two datasets may reveal the first name of the Patient X. In this example, the indicated entity is Patient X and the other entity is the relative.

The determination of step 201 may for example be performed for the two datasets 151.2 and 152.4 on-demand e.g. upon receiving the request of step 203. In another example, the determination of step 201 may be performed as part of an overall determination of relationships of all datasets 151.1-N of the database system 150. This may automatically be performed for the two datasets 151.2 and 152.4 and the other datasets of the database system 150. The automatic execution of step 301 may for example be performed on a time period basis e.g. every day, or upon detecting a change in the database system 150 e.g. a dataset has been changed to a new dataset has been added.

Step 201 may for example be performed by first checking if at least one of the first and second datasets 151.2 and 151.4 can only be used in an anonymized fashion. This check may be performed against predefined governing policies and/or data models of the catalogue 153. If none of the first and second datasets 151.2 and 151.4 is usable in an anonymized fashion, then the method stops.

In one example, the determining of step 201 may be performed by checking if at least one attribute of the first or second dataset 151.2 and 151.4 which is not anonymized represents semantically the same business entity or attribute group or attribute, which could be used to join individual record across the two datasets 151.2 and 151.4. This may be done by using the data term classification information e.g. of the catalogue 153 across the datasets to determine if the same term classifier is used across the datasets and/or by using the data profiling results across the datasets 151.2 and 151.4 to determine if PK/FK constraints are found (e.g. inclusion dependencies) between the datasets. This may suggest that certain attributes could be used for performing join operations between information assets on certain attributes.

In another example, the determining of step 201 may be performed by checking across the datasets 151.2 and 151.4 if any of them contains data which has the same business meaning as the at least one information asset which has one or more areas which are permitted for use only in an anonymized fashion. This may be performed using the classification information of the catalogue 153.

The determination of step 201 may for example be performed using the BINDER algorithm or Minhash technique.

In step 203, a request for at least one of the first and second datasets may be received from a user. The request may be received before or after step 201.

In step 205, at least part of the first and/or second datasets may be modified such that the indication of the entity is not accessible to the user. For example, if one of the two datasets has data masking requirements and at the other datasets does not have data masking requirements the other dataset may be modified although it may not be the requested one.

In step 207, the requested dataset may be provided to the user. The requested dataset may or may not be the modified one of step 205.

In case of PK-FK relationships, an example method may be performed as follows. When a data scientist wants to work with one dataset or a group of datasets, the present method may check a precomputed list of all possible PK-FK relationships between these datasets and also the other datasets available to the same data scientist. The list of all possible relationships obtained in the previous step is used to get the metadata of all result sets that could be obtained by all possible joins that could be built with these relationships between the requested datasets and the other datasets available to the data scientist. For example, the result sets may be generated in accordance with a worst case scenario by simulating the maximum join combinations that could be built from the same requested datasets. A check of the compliance of the possible result sets that could be obtained by these possible joins with the governance policies of the catalog is performed. Based on the result, of the previous check, the data scientist may either receive the requested datasets anonymized such that they comply with the governance policies (e.g. in such a way that even the worst case scenario join results would comply with the governance policies), or the data scientist may receive a suggestion that some datasets which are also available should be removed before the new requested datasets can be loaded with a lower level of anonymization.

The following is an example indicating the advantage of the present method.

For example, a governance policy requires to store only anonymized details of Call Detail Records (CDRs). Assuming for example, that the first dataset comprises the following CDR which is anonymized by modification e.g. masking of the values of the attributes Customer Name, Customer Address, and Customer Phone.

(a) Customer ID: 1122334455
(b) Customer Name: abc7878df343
(c) Customer Address: fgh7878er90
(d) Customer Phone: iop7878tz11
(e) Device: Apple iPhone 6 with ID xyz
(f) Call start: 2.40 pm, Oct. 25, 2016
(g) Call end: 2.50 pm, Oct. 25, 2016
(h) Duration: 10 min
(i) Phone called: 0049-(0)7031-888-9911
(j) Antenna's used during call: 52.5200° N, 13.4050° E And the second dataset comprises a social media post that is posted on a platform (e.g. Twitter, Facebook, LinkedIn) having the following attribute values:

(a) Time of post: 2.39 pm, Oct. 25, 2016
(b) Location: 52.5200° N, 13.4050° E
(c) Device: Apple iPhone 6 with ID xyz
(d) ID of Post: John Smith
(e) Content: "Checkout this cool stuff on . . . "

Studies have shown that the overlay of the metadata in the social media posts with post timings, locations, etc. combined with just the location of the call (antenna locations) and timing with the anonymized version of the CDR allows in many cases to de-anonymize 80% or more of the CDRs being able to know the persons behind the CDR by connecting the anonymized CDRs to social media profiles allowing identification.

Thus, although two datasets, each by itself is harmless, are provided bringing them together breaks the anonymization efforts of one of the two datasets. With the present method if the first dataset is requested, then although that first dataset taken alone may not contain the identity of the caller, the columns identifying the device and the time of the call may be masked or generalized so that it cannot be used anymore to join the first dataset with the second dataset, which would give additional information allowing the identification of the user.

In one example, another example method is provided. The method comprises: receiving a request for a dataset of a group of data sets from a user; determining which further datasets are available to the user; determining all possible primary/foreign key relationships for the combination of (i) the dataset or the group of datasets and (ii) the further datasets available to the user using; determining metadata for possible result sets of joins on the all possible primary/foreign key relationships; checking compliance of the possible result sets with governance policies; anonymizing, where appropriate, some of the requested data to comply with the governance policies before providing access to the requested data set or group of datasets. The determining of all possible primary/foreign key relationships may for example be performed as follows: determining all possible single and multi-column inclusion dependencies in the group of data sets (e.g. using the BINDER algorithm); determining possible pairs of columns to build a key relationship using characteristics (signatures) calculated based on the column values; based on the cardinality of the columns, identifying column pairs where one column is unique or nearly unique (that is, all its values are different), resulting in all possible primary/foreign key relationships.

Various embodiments are specified in the following numbered clauses.

1. A method for data anonymization of a database system, comprising:
determining if a first dataset and second dataset of the database system have a relationship indicative of an entity having values in the two datasets;
receiving a request from a user for at least one of the first and second datasets;
in case the first dataset and second dataset have the relationship, modifying at least one of the first and second datasets such that the indication of the entity is not accessible to the user;
providing the requested dataset.

2. The method of clause 1, wherein the first and second datasets comprise records, each record being a combination of attribute values of a respective entity, wherein the entity indicated by the relationship is an entity of at least one record of the first and/or second datasets.

3. The method of any of the preceding clauses, further comprising determining relationships between all datasets of the database system, and providing a metadata structure comprising information on the determined relationships, wherein the determining if the first and second datasets have the relationship is performed using the metadata structure.

4. The method of clause 3, further comprising: in response to a change in the database system, re-determining the relationships between datasets of the database system and updating the metadata structure accordingly.

5. The method of any of the preceding clauses, the modification being performed in response to determining that an access to the entity by the user would violate a predefined governing policy.

6. The method of any of the preceding clauses, the determining if the relationship is indicative of the entity comprising: identifying one or more source columns of the first dataset that reference to respective target columns of the second dataset, combining the source and target columns, and based on the combination result determining that the relationship is indicative or not indicative of the entity.

7. The method of clause 6, wherein the combination is performed using a SQL join operation.

8. The method of any of the preceding clauses, wherein the determined relationship is a primary foreign key relationship.

9. The method of any of the preceding clauses, further comprising performing the determining if the first dataset and second dataset have the relationship in response to receiving the request and to determining that the first and second datasets are accessible by the user.

10. The method of any of the preceding clauses, the modifying of the requested dataset comprising masking one or more columns of the requested dataset.

11. The method of any of the preceding clauses, the determining of the relationship being automatically performed.

12. The method of clause 11, the determining of the relationship being automatically performed in response to detecting a change in the database system.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
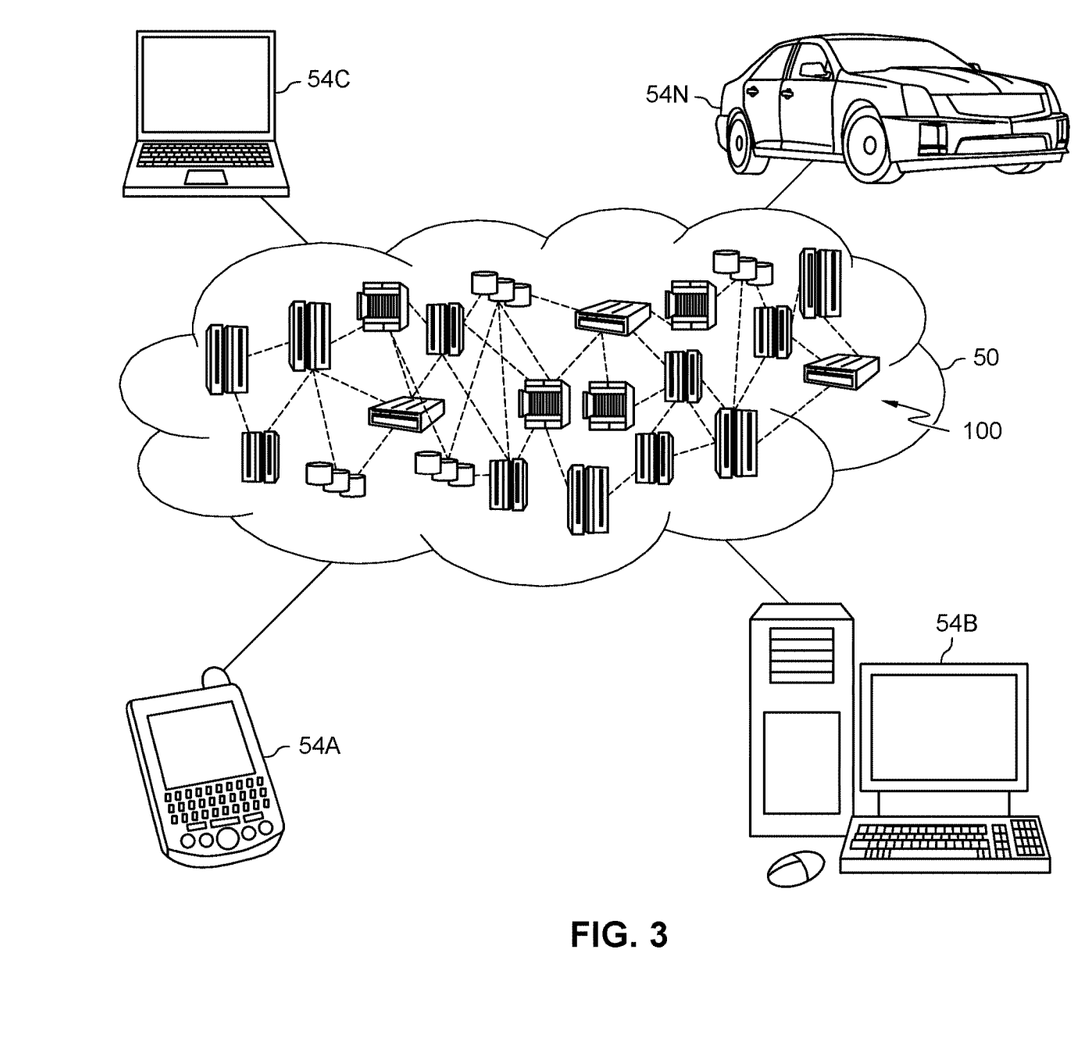
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 100 and cloud computing environment 50 can communicate with any type of computerized device over any type of network and/or network addressable connection (e.g., using a web browser).

Figure 4:
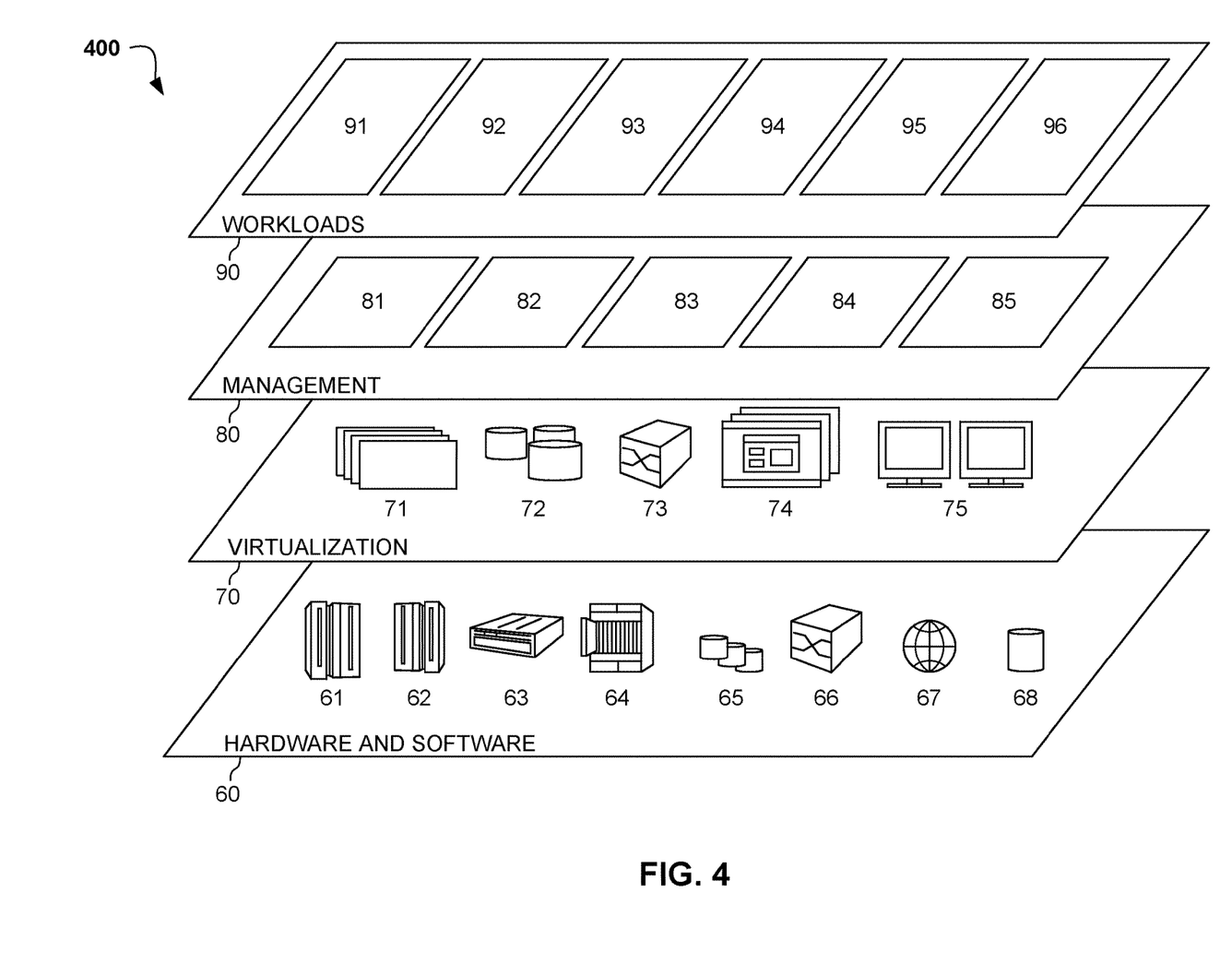
FIG. 4 depicts abstraction model layers according to an embodiment of the present invention.

Referring now to FIG. 4, a set of functional abstraction layers 400 provided by cloud computing environment 50 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data anonymization processing 96. Data anonymization processing 96 may relate to data anonymization of a database system by determining relationships between all datasets of the database system, and providing a metadata structure comprising information on the determined relationships, wherein the determining is performed using the metadata structure. In response to a change in the database system, data anonymization processing 96 may re-determine the relationships between datasets of the database system and update the metadata structure accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data anonymization of a database system, comprising:

determining whether a first dataset and a second dataset of the database system are related, wherein the first dataset and the second dataset are related when the first dataset and the second dataset have a primary foreign key (PK-FK) relationship;

based on determining the first dataset and the second dataset are related, determining a plurality of relationships between entities of the first dataset and the second dataset using a BINDER algorithm or a Minhash technique;

receiving a request for at least one or more records of the first dataset and the second dataset;

based on determining that at least one of the plurality of relationships violates a governing policy, wherein the governing policy comprises one or more rules that enable selective access to the database system, generating a modified requested dataset from the request, using an anonymization algorithm, wherein the modified requested dataset is generated by modifying the first dataset and the second dataset such that the one or more records that violate the governing policy are not accessible in the modified requested dataset; and providing the modified requested dataset.

2. The method of claim 1, wherein the first dataset and the second dataset further comprise records, each of the records being a combination of attribute values of a respective entity, wherein the respective entity having a relationship indicative of the entity of at least one record of the first dataset and the second dataset.

3. The method of claim 1, further comprising determining the plurality of relationships between all datasets of the database system, and providing a metadata structure comprising information on the determined relationships, wherein the determining whether the first dataset and the second dataset have the plurality of relationship is performed using the metadata structure.

4. The method of claim 3, further comprising in response to a change in the database system, re-determining the plurality of relationships between the first dataset and the second dataset of the database system and updating the metadata structure accordingly.

5. The method of claim 1, wherein modifying at least one of the first dataset and the second dataset is further being performed in response to determining that an access to the database system by a user would violate a predefined governing policy.

6. The method of claim 1, further comprising performing the determination whether the first dataset and the second dataset have the plurality of relationships in response to receiving the request and to determining that the first and the second dataset are accessible by a user.

7. The method of claim 1, wherein generating the modified requested dataset further comprising masking one or more columns of the one or more records.

8. A computer program product comprising a computer-readable storage medium having computer-readable program code embodied therewith, the computer-readable program code configured to implement all of steps of the method comprising:
determining whether a first dataset and a second dataset of the database system are related, wherein the first dataset and the second dataset are related when the first dataset and the second dataset have a primary foreign key (PK-FK) relationship;
based on determining the first dataset and the second dataset are related, determining a plurality of relationships between entities of the first dataset and the second dataset using a BINDER algorithm or a Minhash technique;
receiving a request for at least one or more records of the first dataset and the second dataset;
based on determining that at least one of the plurality of relationships violates a governing policy, wherein the governing policy comprises one or more rules that enable selective access to the database system, generating a modified requested dataset from the request, using an anonymization algorithm, wherein the modified requested dataset is generated by modifying the first dataset and the second dataset such that the one or more records that violate the governing policy are not accessible in the modified requested dataset; and
providing the modified requested dataset.

9. A computer system for data anonymization of data of a database system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performing a method comprising:
determining whether a first dataset and a second dataset of the database system are related, wherein the first dataset and the second dataset are related when the first dataset and the second dataset have a primary foreign key (PK-FK) relationship;
based on determining the first dataset and the second dataset are related, determining a plurality of relationships between entities of the first dataset and the second dataset using a BINDER algorithm or a Minhash technique;
receiving a request for at least one or more records of the first dataset and the second dataset;
based on determining that at least one of the plurality of relationships violates a governing policy, wherein the governing policy comprises one or more rules that enable selective access to the database system, generating a modified requested dataset from the request, using an anonymization algorithm, wherein the modified requested dataset is generated by modifying the first dataset and the second dataset such that the one or more records that violate the governing policy are not accessible in the modified requested dataset; and
providing the modified requested dataset.

* * * * *